(12) United States Patent
Lindskog et al.

(10) Patent No.: US 7,443,822 B2
(45) Date of Patent: Oct. 28, 2008

(54) METHOD FOR MULTIHOP ROUTING FOR DISTRIBUTED WLAN NETWORKS

(75) Inventors: Jan Lindskog, Pixbo (SE); Gunnar Rydnell, Frolunda (SE); Peter Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 634 days.

(21) Appl. No.: 10/488,512

(22) PCT Filed: Sep. 11, 2002

(86) PCT No.: PCT/SE02/01625

§ 371 (c)(1),
(2), (4) Date: Sep. 14, 2004

(87) PCT Pub. No.: WO03/028315

PCT Pub. Date: Apr. 3, 2003

(65) Prior Publication Data

US 2005/0013253 A1  Jan. 20, 2005

Related U.S. Application Data

(60) Provisional application No. 60/326,059, filed on Sep. 27, 2001.

(51) Int. Cl.
*H04Q 7/24* (2006.01)

(52) U.S. Cl. ....................... 370/338; 370/329

(58) Field of Classification Search ................ 370/329, 370/330, 343, 344, 338
See application file for complete search history.

(56) References Cited

U.S. PATENT DOCUMENTS

| 6,788,670 | B1 * | 9/2004 | Larsson | 370/351 |
| 7,058,074 | B2 * | 6/2006 | Ho et al. | 370/447 |
| 7,161,951 | B1 * | 1/2007 | Sherman | 370/447 |
| 2002/0160765 | A1 | 10/2002 | Okajima | |
| 2002/0172186 | A1 * | 11/2002 | Larsson | 370/349 |

FOREIGN PATENT DOCUMENTS

JP  AH11-239176  8/1999

(Continued)

OTHER PUBLICATIONS

Wu, Jean Lien C. et al: "An Adaptive Multirate IEEE 802.11 Wireless LAN". Information Networking, 2001, Proceedings. 15th International Conference, pp. 411-418, Jan. 31-Feb. 2, 2001.

(Continued)

*Primary Examiner*—Chi H. Pham
*Assistant Examiner*—Phuc Tran
(74) *Attorney, Agent, or Firm*—Roger S. Burleigh

(57) ABSTRACT

A method for multihop packet trasmissions in a wireless network involves establishing a multihop route through the wireless network. After establishment of the multihop route, transmission protocol parameter are altered to minimize delays for transmissions over the multihop route and at least one packet is transmitted over the multihop route according to the altered transmission protocol parameters. In a first embodiment, the altering of the transmission protocol parameters includes setting a NAV value at each node of the multihop route for a duration of the packet transmissions over the route. In an alternative embodiment, multihop packets are assigned a higher QoS value.

14 Claims, 3 Drawing Sheets

FOREIGN PATENT DOCUMENTS

| | | |
|---|---|---|
| JP | 2001231078 A1 | 8/2001 |
| JP | A2002-124953 | 4/2002 |
| WO | WO 02078272 A1 | 10/2002 |

OTHER PUBLICATIONS

Peetz, Jorg: HiperLAN/2 Multihop Ad Hoc Communication by Multiple-Frequency Forwarding. Pub: Rhodes, Greece (May/2001) Vehicular Technology Conference, IEEE.

Uskela, Sami. Link Technology Aspects in Multihop Ad Hoc Networks. Seminar on Ad Hoc Networking, Espoo, Apr. 12-13, 2002, Networking Laboratory, Helsinki University of Technology. [Online] Retrieved from the Internet: http://koti.welho.com/suskela.publications.html.

Toshifumi Miyagi et al., "A Effective Packet Relay Method employing RTS/ACK Protocol for Multi-hop Wireless LAN Systems", published on Sep. 7, 2000, Proceedings of the 2000 Communications Society Conference of IEICE, The Institute of Electronics, Information and Communication Engineers, p. 455.

* cited by examiner

METHOD FOR MULTIHOP ROUTING FOR DISTRIBUTED WLAN NETWORKS

RELATED APPLICATIONS

This application claims priority from and incorporates herein by reference the entire U.S. Provisional Application Ser. No. 60/326,059, filed on Sep. 27, 2001.

BACKGROUND OF THE INVENTION

1. Field of the Invention

The present invention relates to distributed wireless local area networks, and more particularly, to a method for more efficiently transmitting data within a wireless local area network system using a multihop mechanism.

2. Description of the Related Art

The IEEE (802.11) wireless local area network (WLAN) system enables communication between Stations (STAs) and an Access Point (AP) in an infrastructure system or an infrastructure less system (also called Independent BSS or ad hoc network mode). The IEEE 802.11 WLAN system enables single hop communication between STAs in IBSS (Independent Basic Service Set) mode. The access mechanism is a distributed mechanism called Distributed Coordination Function (DCF) and is based on CSMA/CA (Carrier Sense Multiple Access/Collision Avoidance). In addition to physical CS (Carrier Sense), a virtual CS mechanism is used such that a duration value indicates the length of the transmission for each transmitted packet.

Note that a packet may constitute of one or multiple fragment to decrease the risk of packet retransmissions in the case of e.g. interference, where each fragment of a packet is sent after a SIFS (Short Interframe Space) after an acknowledgement from the receiver indicating the successful reception of previous fragment. The duration value sent in a fragment covers the time to transmit the subsequent fragment, if present, plus its corresponding ACK.

Stations receiving the duration value shall not transmit on a wireless media for a period of time equal to the duration value stored in a duration field. In order to handle the so called hidden terminal problem a RTS/CTS mechanism is used.

Presently, multihop support for 802.11 IBSS networks (ad hoc networks) is not available. Multihopping enables stations out of direct reach from each other to communicate through relaying packets via intermediate stations. An additional benefit with multihop support is that by dividing a distance into multiple hops, each hop experiences significantly improved signal reception quality thanks to the power law propagation model. This can be exploited through the usage of a higher link rate that under certain conditions may even reduce the end to end delay.

While the 802.11 protocol does not inherently support multihopping, it does not exclude higher layer protocols with multihop support from being placed on top of existing 802.11 protocols. Currently, the MANET WG in IETF is working on extensions to the TCP/IP protocol suite for mobile ad hoc networks with multihop capabilities. Several MANET protocols such as AODV and DSR have been tested with the 802.11 protocol operating in the IBSS mode.

However, when these routing protocol are used above the 802.11 protocol to provide multihop routing in the ad hoc network without any connection to the radio access protocol, performance problems will arise. For example, when a packet has to travel multiple hops between wireless stations to reach a destination, severe delays may arise due to the nature of the wireless protocol. Collisions can also occur on each link, and the access delays on each hop can add up. In order to achieve a high throughput for TCP transactions perceived by the end user, delay will comprise a vital factor. Thus, enabling control of multihop packets within the 802.11 protocol would greatly enhance overall network performance.

SUMMARY

The present invention overcomes the foregoing and other problems with a method for multihop packet transmissions in a wireless network wherein the route comprising a plurality of hops is initially established in the wireless network Transmission protocol parameters associated with the multihop route are altered in order to minimize delays for packet transmissions over the multihop route. Packets are transmitted over the multihop route according to the altered transmission protocol parameters.

In a first embodiment, the step of altering the transmission protocol parameters includes setting a NAV value at each node over the multihop route for the duration of the packet transmissions over the multihop route. In an alternative method, multihop packets are transmitted over the multihop route according to a higher QoS value.

BRIEF DESCRIPTION OF TIE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION OF EXEMPLARY EMBODIMENTS

Figure 1:
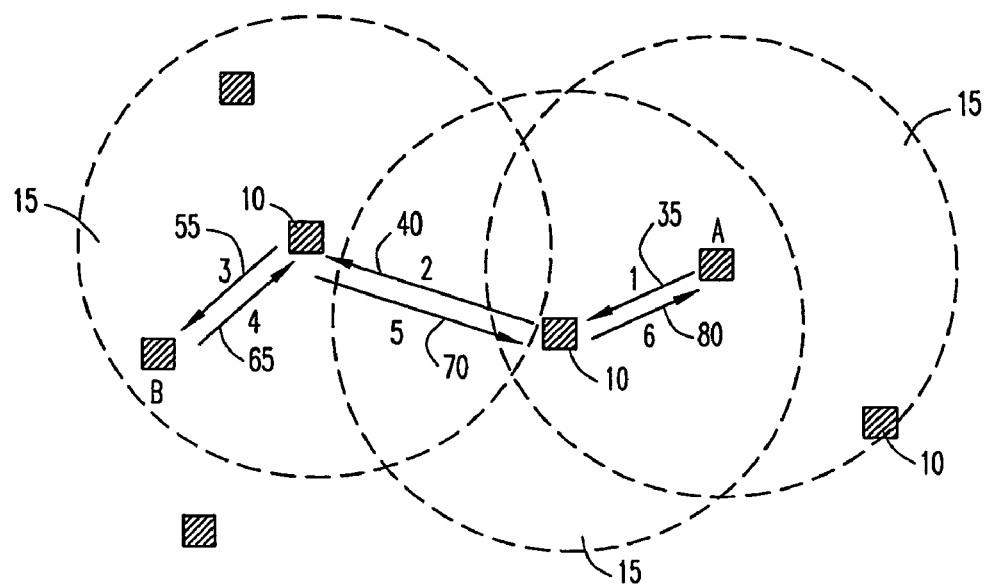
FIG. 1 illustrates the establishment of a multihop connection between a first unit and a second unit in separate IBSS.

Referring now to the drawings, and more particular to FIG. 1, where there are illustrated a number of STAs 10 within three separate IBSSs 15. FIG. 1 illustrates a multihop connection between STA A and STA B. The connection ultimately includes three hops between STA A and STA B using two other STAs 10 in order to establish the connection. According to the present invention, an addition is proposed to the EEE 802.11 protocol. In this proposal, the NAV value at STA nodes within multihop route are expanded to cover a chain of hops between multiple STAs rather than only covering a single link. The NAV value protects transmissions from collision and interference. In this manner, once a multihop route has been established between two STAs 10, the delays for transmitting the payload will be relatively short.

By extending the NAV value to cover multiple links, the overall capacity of the system will be decreased due to the fact that a larger part of the BSS bandwidth is granted to one packet transmission for a longer time period. However, in most cases only two or three hops may be required for a transmission so the capacity reduction does not last for an extended time period.

Figure 2:
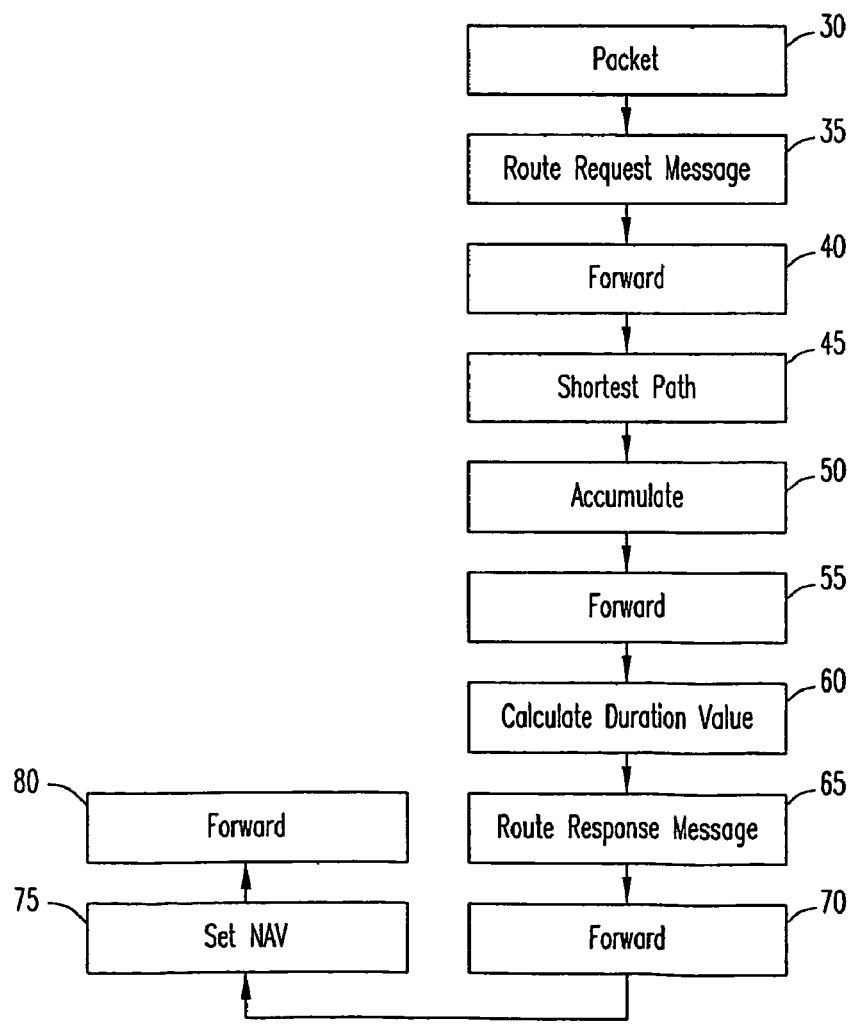
FIG. 2 is a flow diagram illustrating the method for implementing a reactive routing protocol according to the present invention.

Referring now also to FIG. 2, there is illustrated a flow diagram describing the method for implementing the routing protocol of the present invention using the amended NAV value as described above. Initially, at step 30, STA A has a packet to send to STA B. A route request message is transmitted at step 35 from STA A to a next STA 10 in a first hop of the multihop connection. The route request message is forwarded to a second STA 10 at step 40, and a determination is made at step 45 of the shortest path from the present STA 10 back to the STA A The determination of the shortest path is measured with a predetermined cost metric such as number of hops, accumulated path loss, experienced interference resistance, delay due to busy wireless medium, etc. Additionally, at step 50, the reciprocal value of the link delay is accumulated along the pathway as the link rate may differ over each hop between STA A and STA B.

On the third hop link, the route request message is forwarded at step 55 to STA B. The provided route request message includes accumulated information concerning the number of intermediate nodes between STA A and STA B (in this case two), the shortest. path back to STA A, as well as the overall end to end link rate accumulated from the possible link rate over each hop between STA A and STA B. STA B uses the accumulated information received in the route request message to calculate, at step 60, a duration value that represents the transmission time from STA A to STA B for a packet. The duration value represents the time to complete a multihop transmission. STA B returns, at step 65, a routing response message including the calculated duration value within a duration field. The duration field may also include a repetition interval and a path determination time. The repetition interval and path determination time allows a path to be established in a repetitive manner for traffic having repetitive structure such as voice. In order for the route reply message to convey appropriate duration and repetition values, the route request message carries information of the packet length, parameters for any repetitive structure. In addition, each STA ensures that the medium will be available as asked for in a route request message containing e.g. parameter(s) for a repetitive use of the medium as other medium repetition may be executed by neighboring STAs.

The routing response message is forwarded at step 70 from the first intermediate STA 10 to the next STA 10 along the previously used multihop route. STAs within the multihop route use the duration value to set, at step 75, the NAV value at each STA 10 within the multihop link. This causes an STA 10 to refrain from transmitting for a period of time indicated by the duration value. Since the duration value represents the time to complete the packet transmission from STA A, the NAV value prevents transmission for multiple hops rather than just a single hop. The routing response message is forwarded at step 80 back to STA A, and STA A transmits the packet or packets protected by the NAV value settings at each STA 10 back to STAB.

Figure 3:
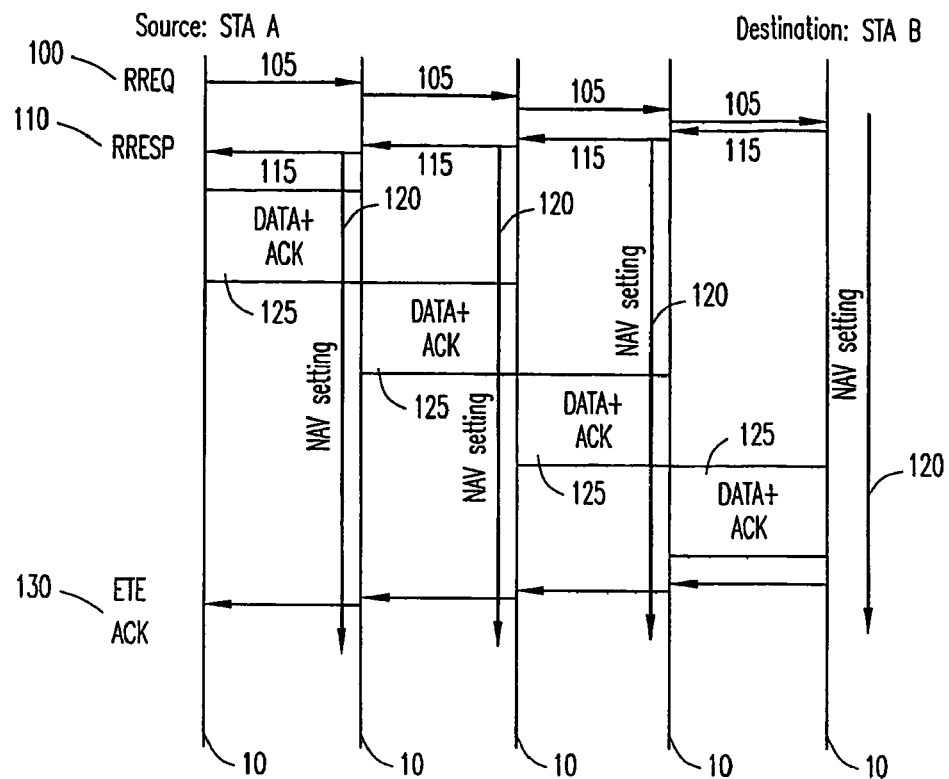
FIG. 3 illustrates implementation of a first embodiment of the present invention.

Referring now to FIG. 3, there is further illustrated the method described with respect to FIG. 2 wherein a packet is transmitted according to the method of the present invention from STA A to STA B over a four hop link using three intermediate STAs 10. As described previously in steps 35, 40 and 55, the route request message 100 is transmitted over multihop link 105 to STA B. The route response message 110 is transmitted back from STA B to STA A over multihop link 115. In order to reduce path setup time and minimize delay variation, a highly prioritized route request and route reply message protocol may be used with respect to the initial transmissions between STA A and STA B in a further embodiment.

At each STA, including STA B from which the route response message originates, the duration value within the duration field is used to set the NAV value for the STA for the period of time necessary to transmit the data packet from STA A to STA B. Once the route response 110 has been received back at STA A, and the NAV settings 120 have been set for each intermediate STA 10, the packet or packets from STA A may be transmitted to STA B. The transmission occurs from STA to STA in a data transmission and acknowledge process 125. Thus, the packet or packets are initially transmitted from STA A over the first hop to the first STA 10a, and STA A receives an acknowledgment of receipt of the packet or packets. This process continues until the packets are finally received and acknowledged by the STA B. Finally, STA B send an ETE acknowledge message 130 back to STA A to indicate receipt of the packet or packets at STA B. After receipt of the acknowledgment message 130 at STA A, the NAV settings will return to normal and the STAs 10 may continue transmissions.

In an additional step, the NAV value may be cleared along the path between STA A and STA B if the transmission from STA A to STA B cannot be completed for some reason or if the transmission is completed prematurely. In this case, an additional clear message may be transmitted from STA A to STA B to clear each of the NAV values within the STA 10.

In a further alternative to the method described in FIG. 2, rather than determining the route from STA A to STA B during transmission of the route request response to message 100, the route may be determined in an earlier route determination process. In this case, the sole task of the route request message 100 would be to allocate a medium along the multilink path between STA A and STA B for a specific time by setting the NAV value and would not be required to determine the path route.

In a further alternative, entire knowledge of the end to end delays between STA A and STA B may be utilized from an earlier route determination process, and the route request message may include a duration value covering the duration of the entire communication between STA A and STA B including transmission of the route request, route response, data acknowledge and acknowledgment messages.

Figure 4:
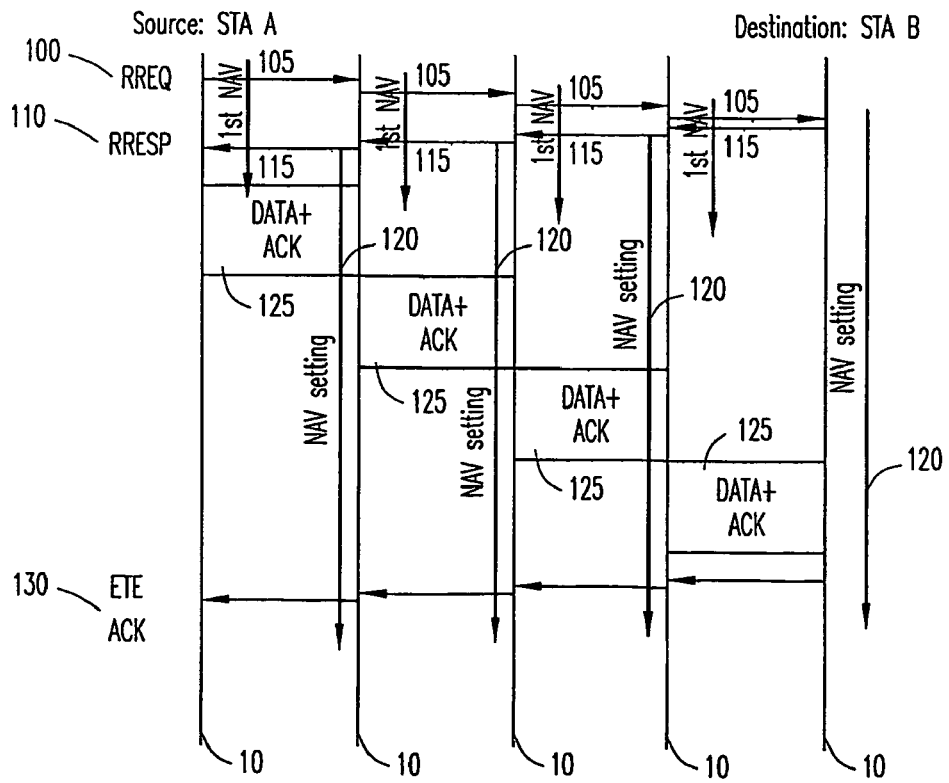
FIG. 4 illustrates an alternative embodiment of the present invention.

In a further embodiment illustrated in FIG. 4, the first route request 100 may use a duration value based upon an earlier measurement of the duration from STA A to STA B or based upon a prediction of the round trip time from STA A to STA B. This information is used to set the NAV value at intermediate STAs during transmission of the route request message to enable quicker return transmission of the route response message 115 from STA B to STA A The remainder of the process operates in the same manner as described with respect to FIG. 3. The route request message 100 can always perceive delays due to a busy wireless media on a link on the way to STA B. Along the link path 105 to STA B the duration value is used to set the NAV value that prevents transmissions in the current IBSS. If the duration value is long enough, the route response message 115 will perceive no busy media on the return path and decrease the latency for the data deliverance from STA A to STA B.

Figure 5:
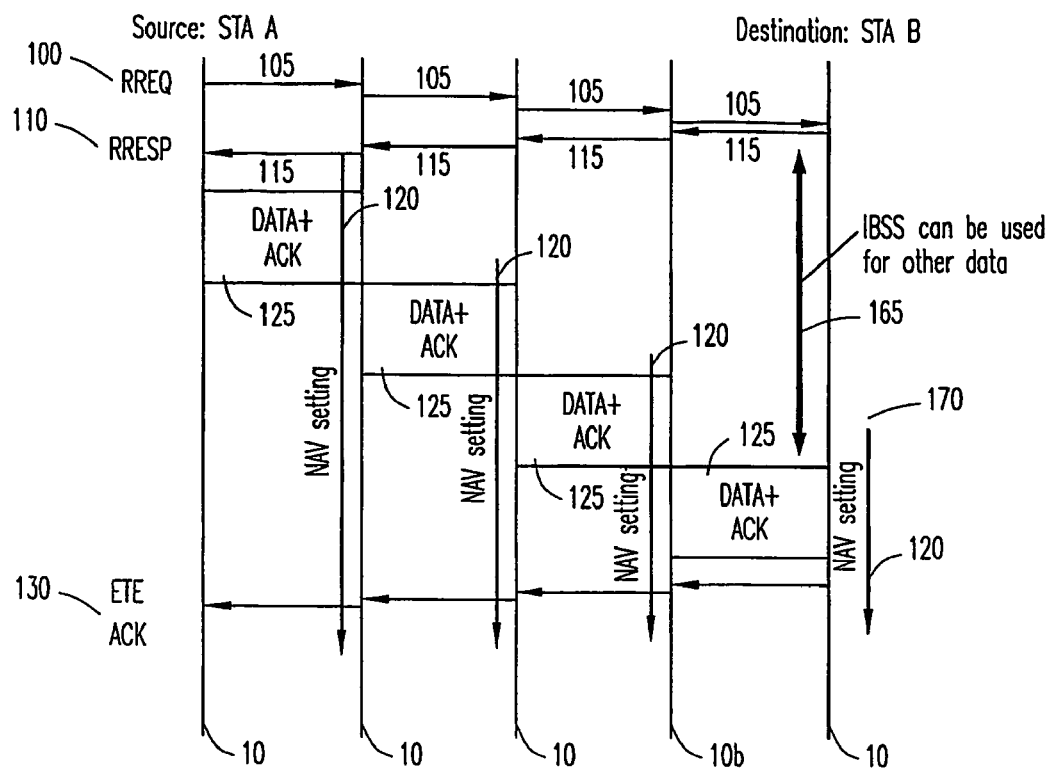
FIG. 5 illustrates a further embodiment of the present invention wherein a prediction of when data is to be transmitted is used.

In yet a further embodiment illustrated in FIG. 5, the route request message 100 is transmitted to STA A from STA B over multihop link 105 as described with respect to FIG. 3. However, the duration value information within the route response message 110 over multi hop link 115 is used in a slightly differing fashion. Instead of setting the NAV value settings to prevent transmissions from an STA from the point that the route response message 110 is received at an STA 10 until completion of transmission of the data from STA A and receipt of the ETE acknowledgment message 130, information within the duration value is used to make an estimate of the point at which the data packet or packets will be received at a particular STA 10 over the multi hop link, and the NAV value is only set at this point until completion of the transmission. This enables the IBSS to be used for transmission of other data until data from STA A is actually received at an STA 10. Thus, with respect to the transmission link between STA 10b and STA B, data may be transmitted over the entire time period 165 until the NAV value settings were set at point 170. Once the data and acknowledgment procedure 125 begins between two particular STAs, the procedure is the same as described with respect to FIG. 3.

The idea is thus to utilise the time until the packet in the multihop flow reaches the hop between e.g. 10b and STAB.

The total delay for the RREQ message consists of contention time to win access to the airlink, transmission time (including a possible retransmission), 'relay time' in each STA 10 until it is ready to start contention and so forth along the multihop flow. To predict when the packet reaches STA 10b, detailed information from each hop must be included in the RREQ and RRESP. It is then a question whether contention delay for one hop will be present or not, and whether 'relay' delay was due to a temporary load on the processing parts for a STA 10. Maybe each STA could insert its own typical 'relay' delay in the RREQ. So at least a minimum time could be estimated. Thus, details from each hop including airlink delay, and STA relay processing time are included in the RREQ and RRESP message. An estimation is then made at each STA 10 when data can arrive at the earliest time.

Figure 6:
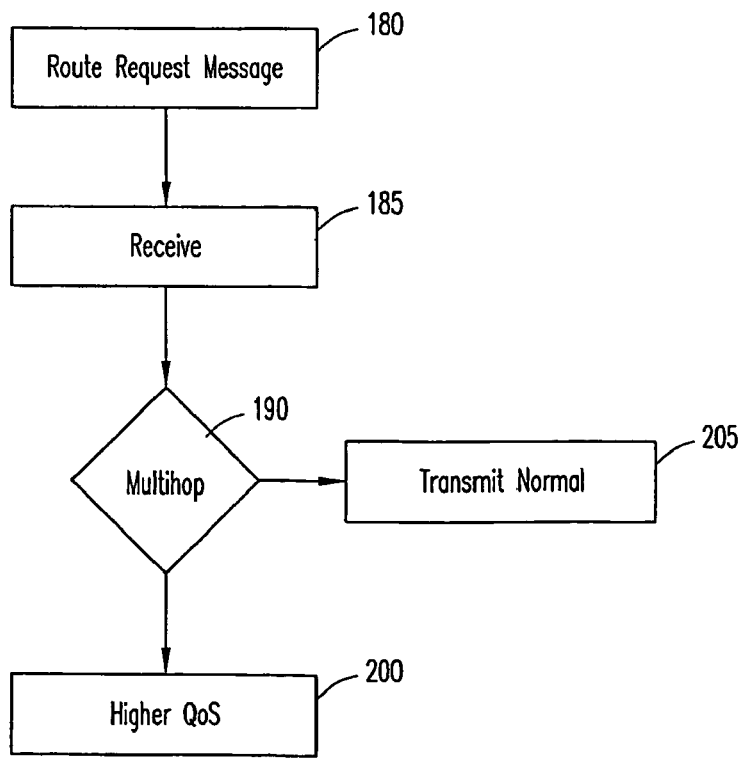
FIG. 6 illustrates yet a further embodiment of the present invention using a high priority access configuration.

In yet a further embodiment illustrated with respect to the flow diagram in FIG. 6, the protocol would initially set up a route between STA A and STA B by transmitting a route request message at step 180 from STA A to STA B and receiving at step 185 the route response message 110 from STA B at STA A. The protocol next determines at step 190 whether or not the packet to be transmitted from STA A to STA B is a multihop transmission requiring the use of a high priority access mechanism. Determination of whether or not a packet is to be transmitted with multiple wireless hops may be done in a number of fashions including but not limited to analyzing the four address fields of the MAC header of the packet to determine whether the source and destination addresses are members of the same IBSS. Members of different IBSS base would utilize the high priority access mechanism. Alternatively, a new information field may be inserted into the MAC header indicating that the packet is a multihop transfer requiring a higher QoS class.

However the determination is made, once it is determined that a multihop transfer of the packet is required, the packet is given a higher QoS class at step 200 than would normally be the case for a non-multihop packet. This enables the packet to be more quickly transmitted over the multihop link. Otherwise, the QoS remains unchanged and the packet is transmitted in the normal fashion at step 205.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A method for transmitting multihop packet transmissions in a wireless network, said method comprising the steps of:
   establishing a multihop route through a wireless network;
   altering transmission protocol parameters to minimize delays for packet transmissions over the multihop route; and,
   transmitting at least one packet over the route according to the altered transmission protocol parameters;
   wherein the step of altering comprises the step of setting a Network Allocation Vector (NAV) value at each node of the route for a duration of the packet transmissions over the route.

2. The method of claim 1, wherein the step of establishing comprises the steps of:
   transmitting a route request message requesting the multihop route from a first node to a second node;
   gathering route data related to the route as the first message travels from the first node to the second node; and
   transmitting a route response message back to the first node from the second node.

3. The method of claim 2, wherein the step of altering further comprises the steps of:
   calculating a duration value indicating an amount of time necessary to complete the multihop packet transmission responsive to the gathered route data;
   including the duration value in the route response message; and
   setting the NAV value at each node of the multihop route responsive to the duration value for a period of time indicated by the duration value.

4. The method of claim 3, further including the step of resetting the NAV value after completion of the transmission.

5. The method of claim 3, further including the step of resetting the NAV value if the transmission ends prior to a time indicated by the duration value.

6. The method of claim 3, wherein the step of establishing further includes the step of determining the multihop route from a previous route determination.

7. The method of claim 3, wherein the duration value is determined from a previous transmission and included in the route request message.

8. The method of claim 2, wherein said route request and route response messages are transmitted according to a high priority.

9. The method of claim 2, further including the steps of:
   determining a second duration value, the second duration value equal to a determined transmission time from the first node to the second node; and
   setting the NAV value responsive to the duration value until completion of the route response message.

10. The method of claim 1, wherein the NAV value is only set once a node begins to receive a packet transmission.

11. The method of claim 1, wherein the step of altering comprises the step of establishing a higher Quality-of-Service (QoS) class for a multihop packet.

12. The method of claim 11, further including the step of determining if a packet is a multihop packet.

13. The method of claim 12, wherein the step of determining comprises the step of analyzing address fields of a MAC header of the packet to determine if a source and destination address are in a same Independent Basis Service Set (IBSS).

14. The method of claim 12, wherein the step of determining comprises the step of identifying a data field in the MAC header of the packet indicating a multihop packet.

* * * * *

UNITED STATES PATENT AND TRADEMARK OFFICE
CERTIFICATE OF CORRECTION

PATENT NO. : 7,443,822 B2 Page 1 of 1
APPLICATION NO. : 10/488512
DATED : October 28, 2008
INVENTOR(S) : Lindskog et al.

It is certified that error appears in the above-identified patent and that said Letters Patent is hereby corrected as shown below:

In Column 2, Line 26, delete "TIE" and insert -- THE --, therefor.

In Column 2, Line 59, delete "EEE" and insert -- IEEE --, therefor.

In Column 3, Line 59, delete "STAB." and insert -- STA B. --, therefor.

In Column 5, Line 20, delete "STAB." and insert -- STA B. --, therefor.

Signed and Sealed this

Seventh Day of April, 2009

JOHN DOLL
*Acting Director of the United States Patent and Trademark Office*